UNITED STATES PATENT OFFICE.

CONRAD RICHARD BOEHM, OF CHARLOTTENBURG, NEAR BERLIN, GERMANY.

MANUFACTURE OF CARBONS FOR ARC-LAMPS.

SPECIFICATION forming part of Letters Patent No. 703,692, dated July 1, 1902.

Application filed April 12, 1902. Serial No. 102,589. (No specimens.)

*To all whom it may concern:*

Be it known that I, CONRAD RICHARD BOEHM, chemist, a subject of the German Emperor, residing at 106 Bismarckstrasse, Charlottenburg, near Berlin, Germany, have invented certain new and useful Improvements in the Manufacture of Carbons for Arc-Lamps; and I do hereby declare the following to be a full, clear, and exact description of the invention, such as will enable others skilled in the art to which it appertains to make and use the same.

The substances hitherto used as additions to arc-lamp carbons to improve and to color the light emitted must be added in relatively large proportions and have sundry disadvantages, such as making the arc unsteady, vacillating in effect, forming slag, and producing smoke and injurious vapors.

The object of this invention is to obtain carbons for arc-lamps being free from the above-mentioned disadvantages. In order to attain this end and to increase the effect of the metallic salts generally used for the purpose in question, I mix these metallic salts with magnesium fluorid in or about the proportion of equal or equivalent molecular weights. When such a mixture is used, a smaller proportion of the metallic salts suffices to obtain the same illuminating power, and the light becomes steadier and more uniform than when there is no magnesium fluorid or an incorrect proportion thereof is used.

In carrying out my invention in practice I finely pulverize different fluorids—as, for instance, fluorids of sodium, calcium, and magnesium—in a well-dried state and mix these salts intimately. To one part of this mixture I add one part of pulverized carbon and form a paste by adding tar or any other suitable binding substance. I shape this paste so as to form carbon pencils suitable for use in arc-lamps by treating it in the usual manner.

If I desire to prepare cored carbons, I advantageously produce the whole core of a mixture of fluorid and carbon, to which I preferably add silicates.

Probably the effect of my invention is caused by chemical reactions which are effected between the substances contained in the mixture by the influence of the voltaic arc.

The magnesium fluorid which I add to the carbons is not reduced in the voltaic arc by the carbon; but it seems that this salt is easily dissociated in the arc. The metallic magnesium thus produced being of an extraordinary reducing power liberates the metals from the metallic salts, so that the produced spectrum is a pure metal spectrum, while the other arcs produced by metallic salts without the addition of magnesium fluorid show an impure spectrum of the salts or oxids employed which are only partially reduced to metals.

On the exterior of the arc the free metal is burned with the oxygen of the air or with the other liberated substances—for instance, with the fluorin—whereby the voltaic arc has a great conducting power, length, and illuminating power, and burns more steadily and uniformly.

When I add to the carbons a proportion of magnesium fluorid being smaller than that of equal or equivalent molecular weights of the other metallic salts employed, an unsteady and vacillating arc results, while when I add a larger proportion of magnesium fluorid than corresponds to the molecular weights the arc of such carbons is steady, but the illuminating efficiency is diminished.

When calcium fluorid is present in the carbons, an intensely-yellow light is produced; but this becomes a flesh color when magnesium fluorid is present, mixed according to my invention with the other metallic salts in the proportion of equal or equivalent molecular weights. This flesh-colored arc is not produced by magnesium fluorid alone.

Having now particularly described and ascertained the nature of my said invention and the manner in which the same is to be performed, I declare that what I claim is—

1. Process for manufacturing carbons for arc-lamps which consists in incorporating into the carbon besides other metallic salts an addition of magnesium fluorid not less in proportion to said salts than is defined by equal or equivalent molecular weights.

2. Process for manufacturing carbons for arc-lamps which consists in incorporating into the carbon besides other metallic salts an addition of magnesium fluorid equal or equivalent to the proportion defined by the molecular weights.

3. As an article of manufacture a carbon for arc-lamps composed of carbon containing a mixture of magnesium fluorid with other metallic salts in which the proportion of the magnesium fluorid, to the other salts is not less than that defined by their respective molecular weights.

4. As an article of manufacture a carbon for arc-lamps composed of carbon containing a mixture of magnesium fluorid with other metallic salts in which the proportion of the magnesium fluorid to the other salts is defined by their respective molecular weights.

In testimony whereof I have affixed my signature in presence of two witnesses.

CONRAD RICHARD BOEHM.

Witnesses:
WOLDEMAR HAUPT,
HENRY HASPER.